(12) United States Patent
Clemens et al.

(10) Patent No.: US 7,130,634 B1
(45) Date of Patent: Oct. 31, 2006

(54) METHOD FOR AUTOMATICALLY DESIGNING CELLULAR MOBILE RADIOTELEPHONE NETWORKS

(75) Inventors: Jurgen Clemens, Stade (DE); Wolf Mende, Bonn (DE); Norbert Schultze, Niederkassel (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 09/646,199

(22) PCT Filed: Jan. 14, 2000

(86) PCT No.: PCT/DE00/00129

§ 371 (c)(1),
(2), (4) Date: Nov. 1, 2000

(87) PCT Pub. No.: WO00/42799

PCT Pub. Date: Jul. 20, 2000

(30) Foreign Application Priority Data

Jan. 14, 1999 (DE) ................................ 199 01 247

(51) Int. Cl.
*H04Q 7/20* (2006.01)
(52) U.S. Cl. .................. 455/446; 455/422.1; 455/403; 370/328; 370/338
(58) Field of Classification Search ................ 455/446, 455/67.7, 423, 457, 2.01; 370/254, 335
See application file for complete search history.

(56) References Cited

U.S. PATENT DOCUMENTS

| | | | | | |
|---|---|---|---|---|---|
| 5,561,841 | A | * | 10/1996 | Markus | 455/446 |
| 6,111,857 | A | * | 8/2000 | Soliman et al. | 370/254 |
| 6,308,072 | B1 | * | 10/2001 | Labedz et al. | 455/448 |
| 6,336,035 | B1 | * | 1/2002 | Somoza et al. | 455/446 |
| 6,418,123 | B1 | * | 7/2002 | Kawakami et al. | 370/254 |
| 6,470,195 | B1 | * | 10/2002 | Meyer | 455/562.1 |
| 2001/0051503 | A1 | * | 12/2001 | Lush | 455/2.01 |

\* cited by examiner

*Primary Examiner*—Erika A. Gary
*Assistant Examiner*—S. Smith
(74) *Attorney, Agent, or Firm*—Cooper & Dunham LLP

(57) ABSTRACT

A method for automatically designing cellular mobile radiotelephone networks whereby a design for a cellular mobile radiotelephone network or partial network for a new planning area can be produced automatically using available planning data for existing, planned, or abstract cellular mobile radiotelephone networks or partial networks and the space-related data of their planning areas and the space-related data of the new planning area, by processing the relationships between the space-related reference and planning data and applying coordinate and angle transformations to the site coordinates of the base stations and main beam directions of the antennae of the base stations of the reference data.

9 Claims, 4 Drawing Sheets

METHOD FOR AUTOMATICALLY DESIGNING CELLULAR MOBILE RADIOTELEPHONE NETWORKS

This is a U.S. national stage of application under 35 U.S.C. §371 of international stage application No. PCT/DE00/00129, filed on Jan. 14, 2000. Priority is claimed under 35 U.S.C. §119(a) and 35 U.S.C. §365(b) form German Patent Application No. 199 01 247.4, which was filed on Jan. 14, 1999, and from which priority was properly claimed in the aforementioned international stage application.

The present invention relates to a method for automatically designing cellular mobile radio telephone networks in accordance with the features of the preamble of patent claim 1.

It is the aim of practical radio network planning for designing cellular mobile radio telephone networks to offer the highest possible quality of service to the largest number of subscribers and it has to be based on predetermined boundary conditions such as, for example, wave propagation characteristics, availability of fixed transmitter sites, useable frequency spectrum, traffic volume to be expected, traffic distribution etc.

In the initial period of mobile radio telephony, the radio network planning was essentially performed manually by a radio network planner. Due to the increase in size and efficiency of networks, efforts were aimed at automating more and more substeps of the planning process. This required powerful computers which have become generally available only in recent times. Known methods for the automatic design, automated planning and/or optimization of cellular mobile radio telephony networks taking into consideration the geographic conditions and/or the behavior of subscribers within the planning region, which have been implemented or are in development, are based on the totality or on parts of the following general method which is shown diagrammatically in FIG. 4.

In a first step, the space-related data of the planning area are preprocessed. Space-related data are understood to be, for example, the space-related radio traffic distribution to be expected, the radio traffic density, topographical data, traffic routes (roads, railway lines) etc. In FIG. 4, a planning area 1 considered is shown diagrammatically, which is subdivided into individual grid squares 2. For each grid square, a predicted traffic density, i.e. a traffic density to be expected, is shown. The darker the gray coloration shown, the higher the expected traffic density.

In a second step, the space-related data are represented as condensed and normalized features which are shown as normalized density points 3 in the example. The condensed and normalized features are processed by means of algorithms for calculating the geographic position of the sites for the base stations 4 of the mobile radio telephone network.

In a third step, finally, the sites of the base stations 4 and of the condensed normalized features are processed by means of algorithms for calculating the parameters of the base stations of the mobile radio telephone network. These parameters are, among others, transmitter power, frequencies, antenna parameters, etc. The proposed coverage areas 5 of the individual base stations 4 are shown, for example, at the bottom in FIG. 4.

This results in a rough planning model which now must be optimized by means of manual work. The example still contains gaps between coverage areas 5 of base stations 4 which must be closed by further planning measures such as, e.g. setting up additional base station sites, increases in transmitter powers etc.

The known methods can either only be used for part-tasks of the automatic network design or contain fundamental problems:

As yet, no automatic method is known which, by means of its application, generates a complete network design, the quality of which is comparable to results of manual radio network planning.

Furthermore, no automatic method is known which, by means of its design, can assess the quality of the results of the automatic network design in comparison with a network or subnetwork planned manually or in operation and can demonstrate these quality levels in the result.

No automatic method is known which, by means of its design, can be applied for different mobile radio telephone standards (GSM, DCS 1800, CDMA, analogue standards, future standards) in parallel and without changing the operations.

No automatic method is known, either, which, by means of its design, achieves the reuse of complete manual planning results and planning experience for new mobile radio telephone networks to be planned by means of automatic operations.

No automatic method is known which, by means of its design, takes into consideration the particular features of different system technologies in the design of networks or subnetworks.

Furthermore, no automatic method is known which, by means of its design, achieves the design of mobile radio telephone networks which combine different mobile radio telephone standards (e.g. GSM 900 and DCS 1800).

The present invention is based on the object of proposing a method for automatically designing cellular mobile radio telephone networks which generates a complete network design, the quality of which is comparable to results of manual radio network planning.

This object is achieved by the characterizing features of claim 1.

The invention is based on a method which automatically generates a design of the cellular mobile radio telephone network or subnetwork for the new planning area from previously produced planning data of implemented, planned or abstract cellular mobile radio telephone networks or subnetworks and the space-related data of their planning areas (reference data) and the space-related data of a new planning area (space-related planning data) by processing the relations between the space-related reference and planning data and application of coordinate and angle transformations to the site coordinates of the base stations and main beam directions of the antennas of base stations of the reference data.

An significant advantage of the method according to the invention is that by this means a realistic complete network design (complete network data and network parameters), which can be used directly for quantification of the investment and planning expenditure and for other planning processing by the user is generated automatically.

Furthermore, the networks or subnetworks generated are automatically assessed by means of quality levels by the method described. This ensures that transparent information on the planning outlay of the further processing of the network design are provided to the user of the method.

A further advantage consists in achieving a selective, automated reuse of manual planning results and the normalized storage of know-how. This leads to a considerably reduced work- and computing load.

Furthermore, the method according to the invention achieves a significant quality improvement of the "synthetic network" function of radio network planning tools by taking into consideration the space-related data of the planning area (e.g. a synthetic network adapted to traffic).

Furthermore, the method described provides for a new class of analysis functions of a radio network planning tool in that network areas with similar or corresponding space-related conditions can be automatically compared.

In addition, the method according to the invention achieves network designs for different mobile radio telephone standards and system technologies by using identically structured reference data of the preproduced networks without changing the operations.

To prepare and carry out the method described, operations, activities and methods are used which are known to an expert and, therefore, will not be explained in greater detail here. These are, e.g.:

the acquisition, storage, testing and processing of space-related grid and/or vector data, the calculation of one- or multi-dimensional features of space-related grid and/or vector data, the calculation of the similarity of objects with multi-dimensional feature vectors including cluster methods, fuzzy and neuroalgorithms, all aspects of the standards of cellular mobile radio telephone networks, the system technology and the technology of terminals of cellular mobile radio telephone networks, and all aspects of models and methods for propagation, coverage, interference, frequency demand, frequency planning and the capacity of cellular mobile radio telephone networks and of the measurement data in the operation of a cellular mobile radio telephone network.

Advantageous embodiments and further developments of the invention are the subject-matter of the dependent patent claims.

Due to the calculations of similarity between the reference data and the planning data, which form the basis of the method, it is possible to assess the quality of the network design by quantifying the relations between space-related reference and planning data. The quality or, respectively, the correspondence of part-areas of the network design to part-areas of the reference network can be expressed, for example, by a number between 0 and 1, where 0 indicates no correspondence and 1 an identical correspondence between the data of the reference area and the planning area. This enables the network planner to estimate rapidly and relatively accurately the expenditure and the costs of any manual post-processing of the network design found which may be required.

In the text which follows, the invention is explained in greater detail by means of an illustrative embodiment, referring to a number of figures in the drawings. The drawings and their description will reveal further features and advantages of the invention.

Figure 4:
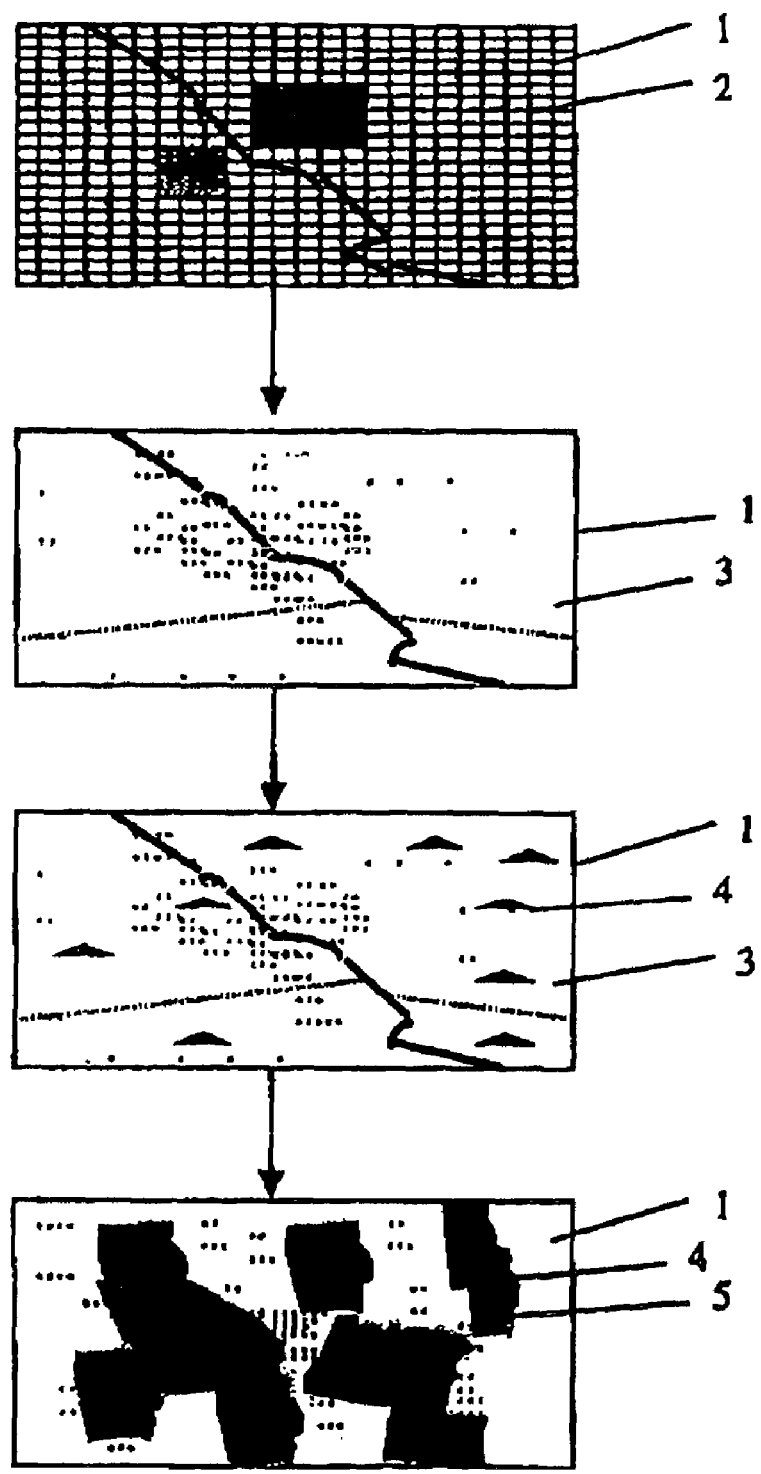

FIG. 4 generally shows the necessary method steps in the (part-)automated radio network planning according to the prior art.

According to the invention, the following considerations are used as a basis:

Two geographic areas having identical space-related features can be supplied by mobile radio telephone networks or subnetworks which are identical apart from the space-related parameters (coordinates of the base stations, main beam directions of the antennas). From this it follows that two geographic areas having identical space-related features can be represented by identical space-related data contents which can be processed by machine.

The preliminary considerations are based on the fact that the number of cellular mobile radio telephone networks which have been planned and have been implemented by network operators such as T-Mobil is very large. If, in theory, this number tends towards infinity, there is already a planning area having identical space-related data contents for each new planning area. The mobile radio telephone network existing locally can be processed for the network design for the new planning area by transformation of the space-related parameters.

Assuming a realistic number of planned and implemented mobile radio telephone networks of a network operator such as T-Mobil, a planning area with identical space-related data contents already exists for each new planning area precisely if, in theory, the size of the area of the planning area tends toward zero or, respectively, approaches the resolution of the space-related data (e.g. 5×5 seconds of arc). The smaller the planning area and the subnetwork connected with this geographical area, the greater the probability that there are identities in the space-related data contents.

The realistic, practical application takes place when the space-related data contents of an existing planning area and a new planning area are considered as being identical by means of the introduction of a similarity criterion. The degree of similarity of the space-related data contents is a quality level of the conformability of the design for the new cellular mobile radio telephone network or subnetwork.

Figure 1:
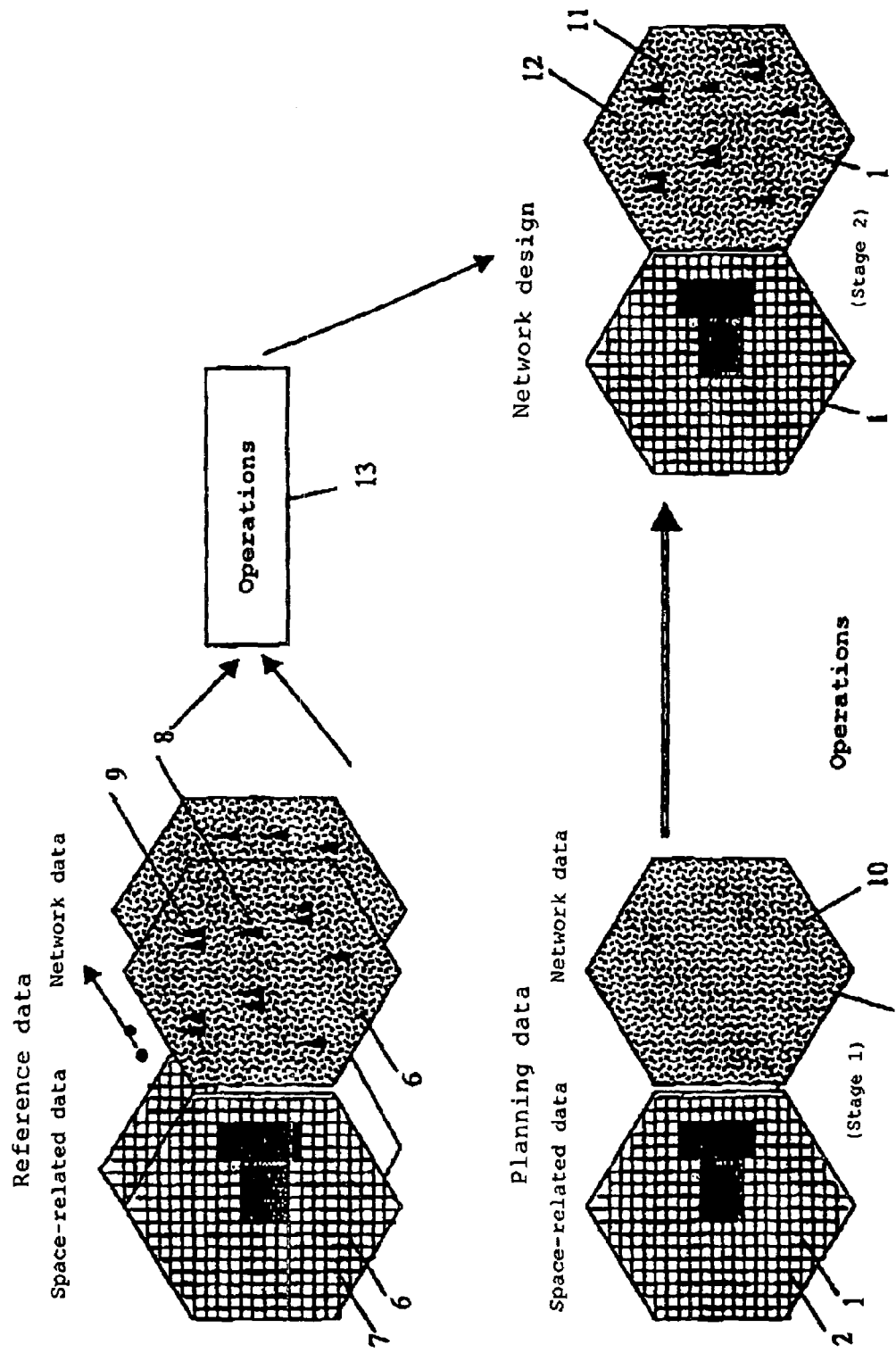
FIG. 1 shows a diagrammatic representation of the method according to the invention.

FIG. 1 diagrammatically shows the sequence of the method according to the invention.

The space-related planning data of planning area 1 are known. The planning data have been previously determined by means of known methods and measures and can contain the following:

elevation data, land utilization data, traffic routes (road data, railway data, shipping lines), traffic data (e.g. distribution of traffic volumes in the grid squares 2), distribution of subscribers, distribution of population or special, suitable subsets of this total set.

The network data 10 which describe the required network or subnetwork are not yet known and are to be determined by the method.

From radio network planning operations in a planning area 6 considered, which have already been carried out, the network data and parameters are known and represent a corresponding set of reference data which are connected to the planning areas of these preproduced, planned or implemented mobile radio telephone networks or subnetworks via one-to-one relation: these data also contain:

elevation data, land utilization data, traffic routes (road data, railway data, shipping lines), traffic data (e.g. distribution of traffic volumes in grid squares 7), distribution of subscribers, distribution of population or special, suitable subsets of this total set.

This provides reference data which contain both the subset of the network data and network parameters of the preproduced mobile radio telephone networks (e.g. sites of the base stations 9 and resultant field strength distributions 8) and, connected via one-to-one relations, the subset of the space-related data of their planning areas.

According to the invention, operations 13 are now performed which implement a conversion from the state of preproduced mobile radio telephone networks or subnetworks 6 into the state of network design for a new planning area 1.

The part-operations are:
Feature calculation of space-related reference and planning data 7 which are represented as one- or multidimensional features or parameters.
Similarity calculation of multidimensional features of the planning area 1 and the planning area 6,
Mapping of the sites of the base stations of reference area 6 onto planning area 1 by coordinate transformation of the sites of base stations 9 into geographical longitude, latitude and rotation related to the zero meridian,
Angle transformation of the main beam directions of the antennas of base stations 9 for rotations related to the zero meridian.

This results in a network design which consists of planning data and parameters of the automatically generated, complete mobile radio telephone network or subnetwork (site of the base stations 12, parameters for calculating the field strength distribution 11, etc.). The more closely the reference area and its space-related data correspond to the planning area and its space-related data, the greater the correspondence of the network data of the network design to the data of the reference network design.

Figure 2:
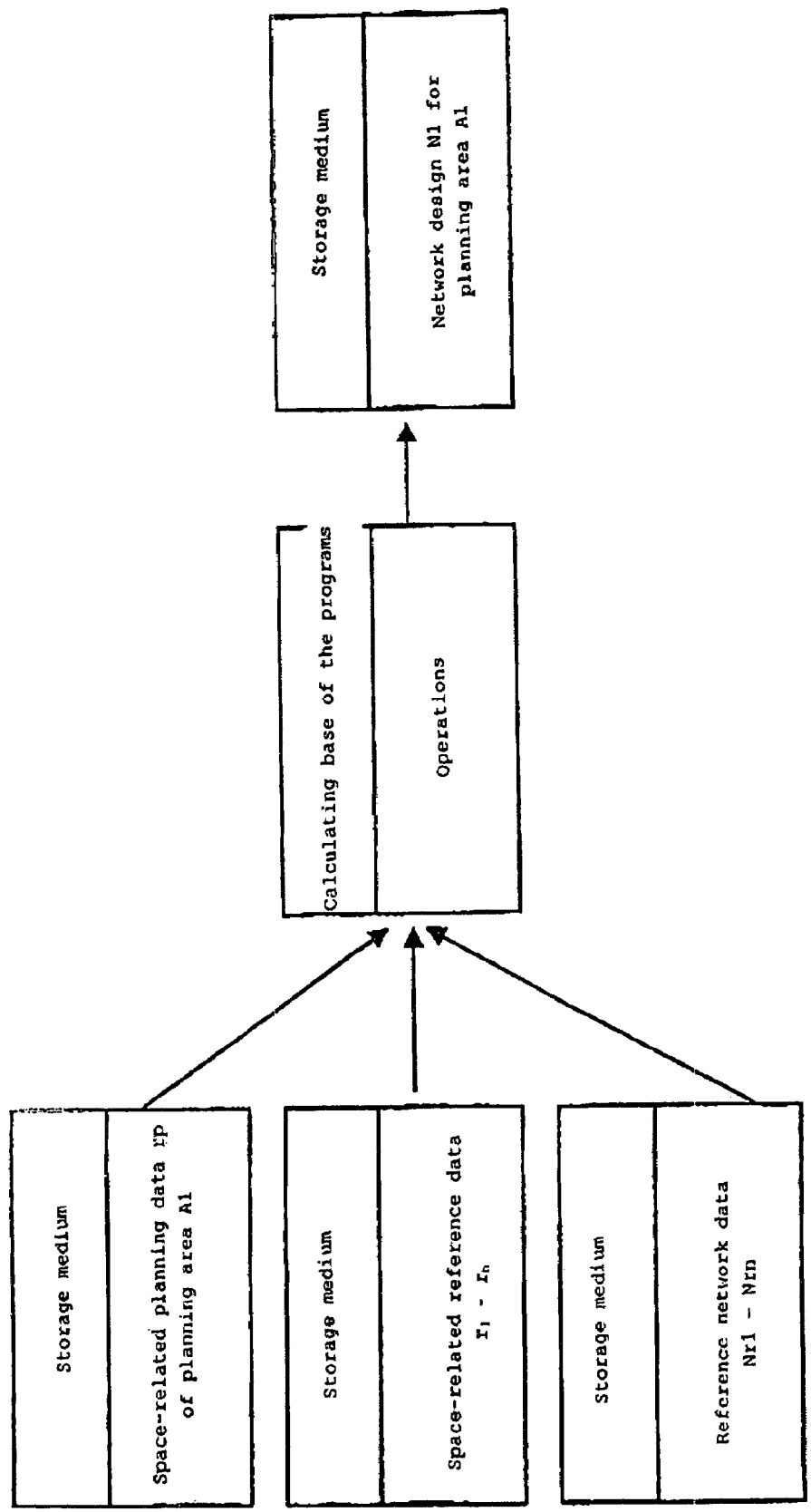
FIG. 2 shows diagrammatically the structure of the technical implementation of the method.

According to FIG. 2, therefore, this results in a method for automatically designing cellular mobile radio telephone networks, in which
without necessary human intervention,
for a mobile radio telephone network or subnetwork N1 to be planned,
on a geographic area 1,
a real or abstract mobile radio telephone network or subnetwork N2, on a real or abstract geographic area 6,
is changed in the space-related parameters site coordinates of base stations 9, 12 and antenna main beam directions,
and on the geographic area 1 is substituted by coordinate transformation of the geographical longitude, latitude and rotation with respect to the zero meridian in network N1,
at the precise instant, when the features of the space-related data of the geographic areas 1 and 6 are equal or are set to be equal in accordance with a particular criterion.

To implement the method according to the invention technically, computer hardware and software of a radio network planning tool including the input/output peripherals, corresponding to the prior art, must be supplemented by programs for implementing the operations of the method according to the invention.

Storage media corresponding to the prior art must be provided for space-related grid and vector data.

Furthermore, storage media corresponding to the prior art must be provided for planning data and parameters of planned or implemented cellular mobile radio telephone networks or subnetworks. The data of the reference data can be called up in appropriate databases.

Figure 3:
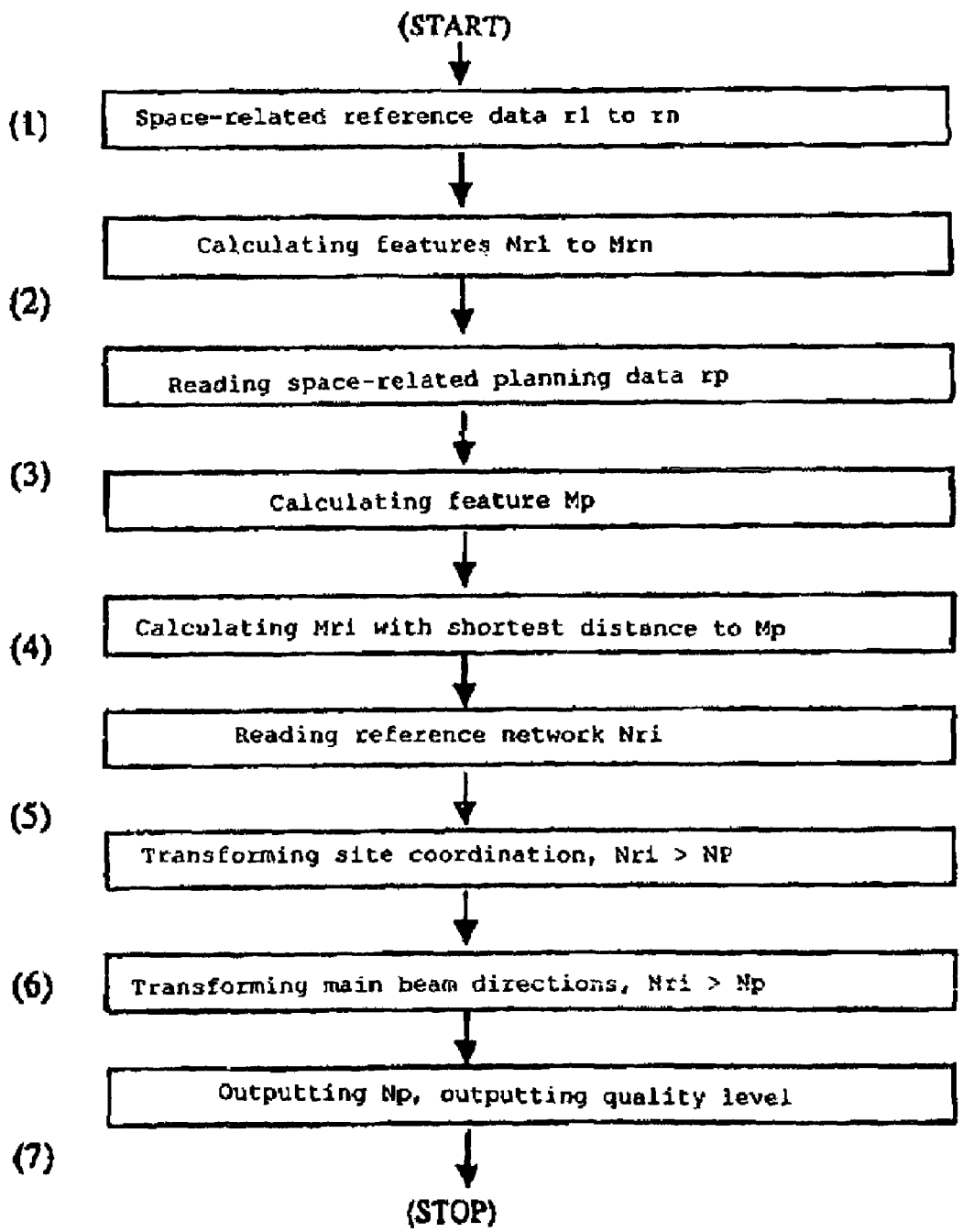
FIG. 3 shows a flow chart of the most important method steps.

FIG. 3 again describes the steps of the automated planning method in detail:

(1) Reading the space-related reference data r1 to rn:
The space-related data of the reference networks (in each case represented by their space-related reference data and their reference network data) are accessed.

(2) Calculating features Mr1 to Mrn:
For each reference network ri, i=1 to n, a feature Mri is calculated. Both general prior art methods of pattern recognition and data condensation and normalized storage techniques for the space-related data as matrix or node/edge vector without special data condensations can be used.

(3) Reading the space-related planning data rp:
The space-related data of the planning area are accessed (4) Calculating the features Mp:
Calculations according to Step (2) for the space-related planning data (5) Calculating feature Mri with the shortest distance to feature Mp:
The feature Mri (reference network data) having the shortest distance to feature Mp (planning data) in the feature space is calculated by using methods corresponding to the prior art for calculating the similarity of objects having multidimensional feature vectors (e.g. cluster method). The associated reference network Nri is determined via index i due to the one-to-one relation between space-related reference data and reference network data.

(6) Reading the data of reference network Nri:
The network data and parameters Nr1 to Nrn of the reference network are accessed (7) Transformation of the site coordinates Nri→Np
Establishing geographic congruence of the space-related reference data i and planning data p by displacement (geographic longitude and latitude) and rotation with respect to the zero meridian. Analogous coordinate transformation of the sites of the base stations (application addition, subtraction, circular function).

(8) Transformation of the main beam directions Nri→Np
Analogously to step (7), transformation of the angles of the main beam directions of the antennas of the base stations with respect to the geographic location from Nri to Np (application of addition and subtraction).

(9) Outputting the data of the network design Np:
Storing the data of the network design Np on the storage medium Output of the distance of the features Mri (space-related reference data) and Mp (space-related planning data) in the multidimensional feature space as quality level for the conformability of the automatically generated network design Np.

LEGEND OF DRAWINGS

1 Planning area
2 Grid square
3 Density points
4 Base station
5 Coverage area
6 Reference area
7 Grid square
8 Field strength distribution
9 Base station
10 Network data to be determined
11 Field strength distribution
12 Base station
13 Operations

The invention claimed is:

1. A method for automatically designing cellular mobile radio telephone networks, wherein, from network-related and space-related reference data including existing planning data of implemented, planned or abstract cellular mobile radio telephone networks or subnetworks and the space-related data of their planning areas, and the space-related data of a new planning area, a design of the cellular mobile radio telephone network or subnetwork for the new planning area is automatically generated by processing the relationships between the space-related reference and the space-related data of the new planning area and application of coordinate and angle transformations to the site coordinates of the base stations and main beam directions of the antennas of the base stations of the reference data.

2. A method according to claim 1, wherein the quality of the network design is assessed by quantifying the relationships between the space-related reference data and the space-related data of the new planning area.

3. A method according to claim 1, wherein the space-related data of the new planning area are acquired, stored, tested and processed.

4. A method according to claim 1, wherein the space-related data of the new planning area are represented as one or multi-dimensional features and/or parameters and are kept stored in a database.

5. A method according to claim 1, wherein the space-related and network-related reference data are kept stored in a database and are represented as one or multi-dimensional features and/or parameters.

6. A method according to claim 1, wherein, for a mobile radio telephone network or subnetwork (N1) to be planned on a geographic area (1) a real or abstract mobile radio telephone network or subnetwork (N2) on a real or abstract geographic area (6) is changed in the space-related parameters, site coordinates and antenna main beam directions and on the geographic area (1) is substituted in the subnetwork (N1) to be planned by coordinate transformation of the geographic longitude, latitude and rotation with respect to the zero meridian at the precise instant when the features of the space-related data of the geographic areas (1) and (6) are equal or are said to be equal in accordance with a particular criterion.

7. A method for automatically generating a design for a cellular mobile radio telephone network using network-related and space-related reference data of existing implemented, planned, or abstract cellular mobile radio telephone networks or subnetworks, and space-related data of a new planning area, comprising the steps of:

processing relationships between the space-related reference data and space-related data of the new planning area; and applying coordinate and angle transformations to site coordinates of base stations of the reference data and to main beam directions of antennas of the base stations of the reference data.

8. A method for automatically generating a design for a planned second cellular mobile radio telephone network using network-related and space-related reference data of a geographical area of an existing first implemented, planned, or abstract cellular mobile radio telephone network or subnetwork, and space-related data of a geographical area of a new planning area, comprising the steps of:

processing relationships between the space-related reference data and space-related planning data; and applying coordinate and angle transformations to site coordinates of base stations of the reference data and to main beam directions of antennas of the base stations of the reference data, wherein space-related parameters, site coordinates, and antenna main beam directions of the existing first network or subnetwork are changed; and geographic longitude, latitude, and rotation with respect to a zero meridian are substituted in the planned second network or subnetwork by coordinate transformation at an instant when the features of the space-related reference data and the space-related planning data are equal or are equal in accordance with a particular criterion.

9. A method for automatically generating a design for a planned second cellular mobile radio telephone network using network-related and space-related reference data of existing first implemented, planned, or abstract cellular mobile radio telephone networks or subnetworks in a reference area, and space-related data of a new planning area, comprising the steps of:

calculating features of the space-related reference data and the space-related planning data which are represented as one-dimensional or multi-dimensional features or parameters;

performing similarity calculation of the multi-dimensional features of the reference area and the planning area;

mapping sites of base stations of the reference area onto the planning area by coordinate transformation of the reference area base station sites into geographical longitude, latitude, and rotation relative to a zero meridian; and transforming angles of main beam directions of antennas of the base stations for rotation relative to the zero meridian.

* * * * *